(12) United States Patent
Krajenke

(10) Patent No.: US 9,366,068 B2
(45) Date of Patent: Jun. 14, 2016

(54) HOOD POP AND HANG SPIRAL SPRING COUNTERBALANCE MECHANISM

(71) Applicant: GM GLOBAL TECHNOLOGY OPERATIONS LLC, Detroit, MI (US)

(72) Inventor: Gary W. Krajenke, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/495,947

(22) Filed: Sep. 25, 2014

(65) Prior Publication Data

US 2016/0090769 A1  Mar. 31, 2016

(51) Int. Cl.
*B62D 25/12* (2006.01)
*E05F 1/12* (2006.01)

(52) U.S. Cl.
CPC .............. *E05F 1/1276* (2013.01); *B62D 25/12* (2013.01); *E05F 1/1207* (2013.01); *E05Y 2900/536* (2013.01)

(58) Field of Classification Search
CPC ...... B62D 25/10; B62D 25/12; B62D 25/105; E05F 1/12; E05F 1/1207; E05F 1/1008; E05F 1/1276; E05F 1/10; E05Y 2900/536
USPC .............................................. 296/76, 193.11
See application file for complete search history.

(56) References Cited

U.S. PATENT DOCUMENTS

| | | | | |
|---|---|---|---|---|
| 2,612,651 | A * | 10/1952 | Roethel ................. | E05F 1/1207 16/295 |
| 2,720,676 | A * | 10/1955 | Vigmostad ................ | E05D 3/16 16/289 |
| 5,235,725 | A * | 8/1993 | Rees ...................... | E05F 1/1207 16/298 |
| 5,390,904 | A * | 2/1995 | Rivard ................... | E05F 1/1207 16/289 |
| 6,006,475 | A * | 12/1999 | Schwantes .............. | E05F 3/224 16/49 |
| 6,487,754 | B1 * | 12/2002 | Keen ...................... | B62D 25/10 16/289 |
| 7,546,663 | B2 * | 6/2009 | Duffy .................... | E05F 1/1016 16/296 |
| 8,607,416 | B2 * | 12/2013 | Krajenke .............. | E05F 1/1238 16/297 |
| 8,997,313 | B1 * | 4/2015 | Krajenke .............. | E05F 1/1207 16/285 |
| 2002/0167188 | A1 * | 11/2002 | Zagaroff ............ | B62D 33/0273 296/57.1 |
| 2004/0026950 | A1 * | 2/2004 | Zagaroff ............ | B62D 33/0273 296/57.1 |
| 2005/0045395 | A1 * | 3/2005 | Boden .................... | B62D 25/10 180/69.21 |
| 2006/0102402 | A1 * | 5/2006 | Birk ........................ | B60R 21/38 180/89.17 |
| 2006/0230578 | A1 * | 10/2006 | Renke ..................... | E05D 5/062 16/289 |
| 2009/0194348 | A1 * | 8/2009 | Faubert ................... | B60J 7/102 180/69.21 |
| 2009/0302644 | A1 * | 12/2009 | Mori ....................... | B60R 21/38 296/193.11 |
| 2013/0318745 | A1 * | 12/2013 | Krajenke .............. | E05F 1/1284 16/305 |

* cited by examiner

*Primary Examiner* — Gregory Blankenship
(74) *Attorney, Agent, or Firm* — Quinn Law Group, PLLC

(57) ABSTRACT

A counterbalance mechanism includes a first attachment strap that is fixedly attached to a body structure. An intermediate link is rotatably attached to the first attachment strap and rotatable about a winding axis relative to the first attachment strap. A first end of a second attachment strap is rotatably attached to a moveable panel. A second end of the second attachment strap is rotatably attached to the intermediate link, with the second attachment strap and the intermediate link rotatable relative to each other about a link axis. A spiral spring interconnects the first attachment strap and the intermediate link. The spiral spring biases the intermediate link about the winding axis to rotate the intermediate link and the second attachment strap relative to each other about the link axis, in a scissor-like motion, to rotate the panel relative to the body structure.

17 Claims, 3 Drawing Sheets

HOOD POP AND HANG SPIRAL SPRING COUNTERBALANCE MECHANISM

TECHNICAL FIELD

The disclosure generally relates to a counterbalance mechanism for biasing a moveable panel, e.g., a hood, relative to a body structure of a vehicle.

BACKGROUND

Counterbalance mechanisms are often used to bias a first component relative to a second component. For example, a vehicle may include a counterbalance mechanism for biasing a hood or a truck deck lid relative to a vehicle body structure. The counterbalance mechanisms provide a biasing force which helps or assists in moving the first component relative to the second component. The biasing force from the counterbalance mechanism reduces the force that a user must apply to lift or move the first component relative to the second component.

Counterbalance mechanisms typically include a spring, which is used to provide the biasing force of the counterbalance mechanism. One type of spring used in counterbalance mechanisms is a spiral spring. A spiral spring may alternatively be referred to as a clock spring. Spiral springs include a flat strip of spring steel that is coiled up around an axis in a shape of an Archimedean spiral to define a plurality of coils. An Archimedean spiral may be defined as the locus of points corresponding to the locations over time of a point moving away from a fixed point with a constant speed along a line which rotates with constant angular velocity about a center.

SUMMARY

A counterbalance mechanism is provided. The counterbalance mechanism includes a first attachment strap, and an intermediate link rotatably attached to the first attachment strap. The intermediate link is rotatable about a winding axis relative to the first attachment strap. A second attachment strap is rotatably attached to the intermediate link. The second attachment strap and the intermediate link are rotatable about a link axis relative to each other. A spiral spring interconnects the first attachment strap and the intermediate link. The spiral spring biases the intermediate link about the winding axis to rotate the intermediate link and the second attachment strap relative to each other about the link axis, in a scissor-like motion.

A vehicle is also provided. The vehicle includes a body structure, and a hood rotatably attached to the body structure. The hood is rotatable about a panel rotation axis relative to the body structure. A counterbalance mechanism rotatably biases the hood relative to the body structure about the panel rotation axis. The counterbalance mechanism includes a first attachment strap attached to the body structure. The first attachment strap is stationary relative to the body structure. An intermediate link is rotatably attached to the first attachment strap. The intermediate link is rotatable about a winding axis relative to the first attachment strap. The intermediate link extends between a first end and a second end. The second end of the intermediate link is rotatably attached to the first attachment strap at the winding axis. A second attachment strap is rotatably attached to the intermediate link. The second attachment strap and the intermediate link are rotatable about a link axis relative to each other. The second attachment strap extends between a first end and a second end. The first end of the second attachment strap is rotatably attached to the hood for rotation about a panel support axis. The second end of the second attachment strap is rotatably attached to the first end of the intermediate link at the link axis. A spiral spring interconnects the first attachment strap and the intermediate link. The spiral spring biases the intermediate link about the winding axis to rotate the intermediate link and the second attachment strap relative to each other about the link axis, in a scissor-like motion. The scissor-like motion of the intermediate link and the second attachment strap rotates the hood relative to the body structure about the panel rotation axis.

Accordingly, by fixing the position of the spiral spring in place relative to the body structure, the intermediate link and the second attachment strap are the only moving components of the counterbalance mechanism, thereby minimizing the amount of space required for packaging the counterbalance mechanism. Additionally, the kinematics of the counterbalance mechanism provides enough energy to the moveable panel, e.g., the hood, to "pop open" the hood, thereby eliminating the need for a pop up spring in a hood latching system.

The above features and advantages and other features and advantages of the present disclosure are readily apparent from the following detailed description of the best modes for carrying out the disclosure when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the disclosure may be described herein in terms of functional and/or logical block components and/or various processing steps. It should be realized that such block components may be comprised of any number of hardware, software, and/or firmware components configured to perform the specified functions.

Figure 1:
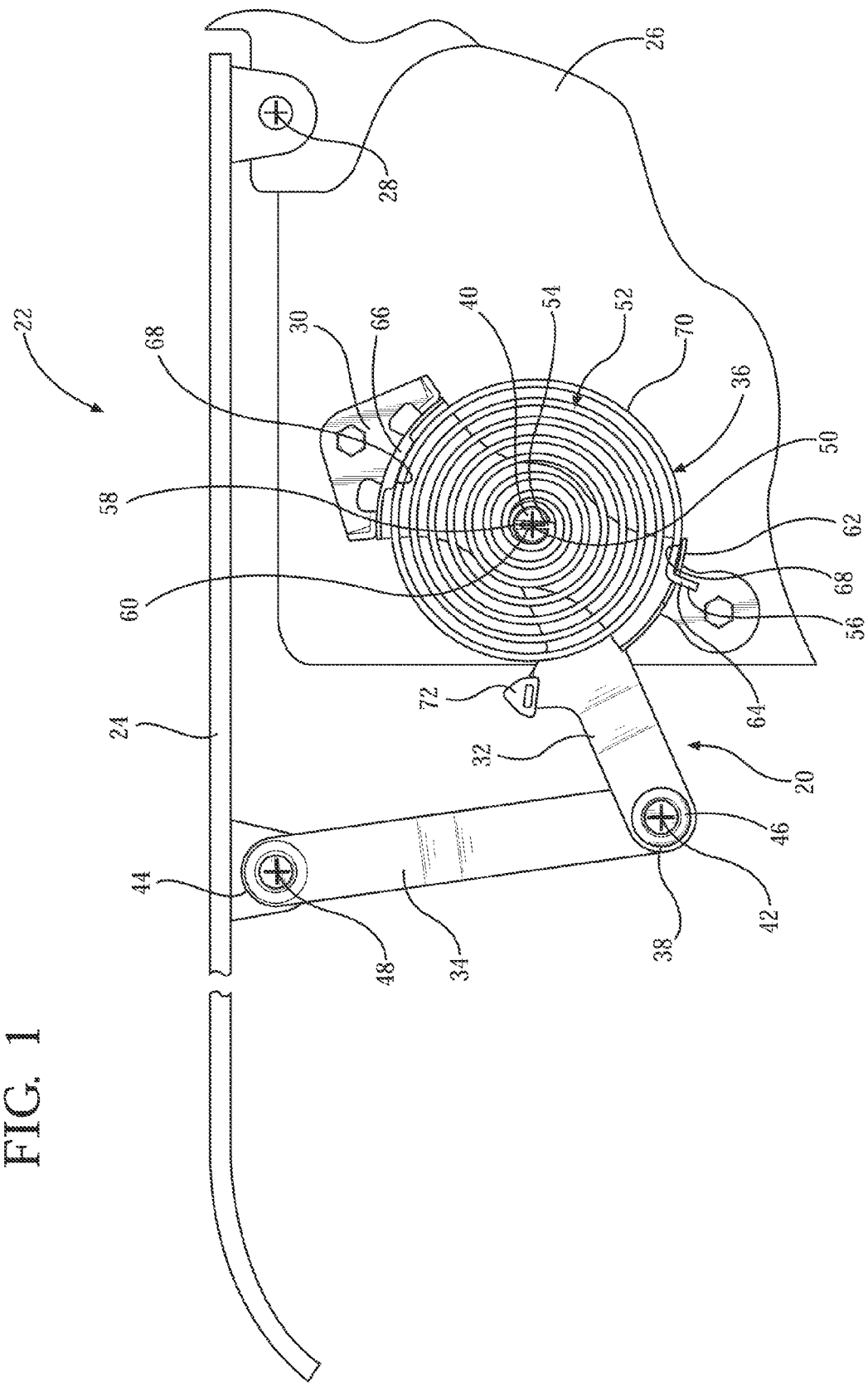
FIG. 1 is a schematic plan view from a side showing a counterbalance mechanism biasing a panel relative to a body structure of a vehicle, with the panel in a closed position.
Figure 2:
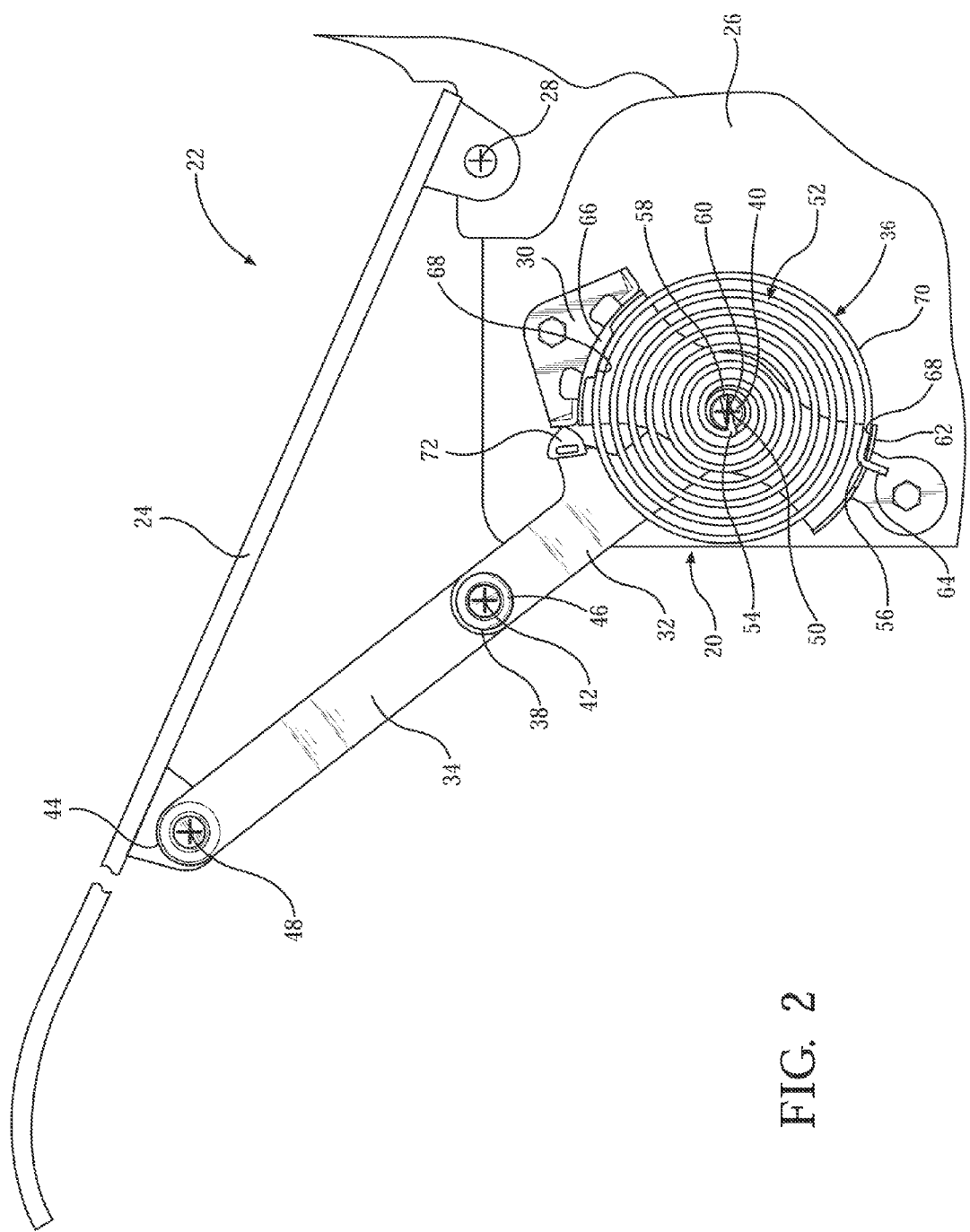
FIG. 2 is a schematic plan view from a side showing the counterbalance mechanism biasing the panel relative to the body structure, with the panel in an open position.

Referring to the Figures, wherein like numerals indicate like parts throughout the several views, a counterbalance mechanism is generally shown at 20. Referring to FIGS. 1 and 2, the counterbalance mechanism 20 is shown in a vehicle 22, biasing a first component relative to a second component. The first component may include, for example, a panel 24 such as but not limited to a hood or trunk deck lid of the vehicle 22. The first component is hereinafter referred to as the panel 24. The second component may include, for example, a body structure 26 of a vehicle 22. The second component is hereinafter referred to as the body structure 26. As such, the counterbalance mechanism 20 may be configured to bias the panel 24, i.e., the hood or trunk deck lid, relative to the body structure 26, to assist in opening the panel 24.

The panel 24 is rotatably attached to the body structure 26. The panel 24 is rotatable about a panel rotation axis 28 relative to the body structure 26, between a closed position and an open position. The closed position is generally shown in FIG.

1, and the open position is generally shown in FIG. 2. The counterbalance mechanism 20 rotatably biases the panel 24 relative to the body structure 26, about the panel rotation axis 28.

The counterbalance mechanism 20 includes a first attachment strap 30, an intermediate link 32, a second attachment strap 34, and a spiral spring 36. The first attachment strap 30 is attached to the body structure 26. The first attachment strap 30 may be attached to the body structure 26 in any suitable manner that positionally fixes the first attachment strap 30 relative to the body structure 26. As such, the first attachment strap 30 is stationary and does not move relative to the body structure 26.

The intermediate link 32 extends between a first end 38 and a second end 40. The first end 38 of the intermediate link 32 is rotatably attached to the second attachment strap 34. The intermediate link 32 and the second attachment strap 34 are rotatable relative to each other about a link axis 42. The link axis 42 is disposed at a vertex between the second attachment strap 34 and the intermediate link 32. The second attachment strap 34 extends between a first end 44 and a second end 46. The first end 44 of the second attachment strap 34 is rotatably attached to the panel 24 for rotation about a panel support axis 48. Accordingly, the second attachment strap 34 is rotatable relative to the panel 24 about the panel support axis 48. The second end 46 of the second attachment strap 34 rotatably attached to the first end 38 of the intermediate link 32 at the link axis 42.

The second end 40 of the intermediate link 32 is rotatably attached to the first attachment strap 30. The intermediate link 32 is rotatable relative to the first attachment strap 30 about a winding axis 50. The winding axis 50 is disposed at a vertex between the intermediate link 32 and the first attachment strap 30. The second end 40 of the intermediate link 32 is attached to the first attachment strap 30 at the winding axis 50.

The spiral spring 36 interconnects the first attachment strap 30 and the intermediate link 32. The spiral spring 36 biases the first attachment strap 30 and the intermediate link 32 angularly relative to each other about the winding axis 50. The spiral spring 36 biases the intermediate link 32 about the winding axis 50 to rotate the intermediate link 32 and the second attachment strap 34 relative to each other about the link axis 42, in a scissor-like motion, which rotates the panel 24 relative to the body structure 26 about the panel rotation axis 28.

The spiral spring 36 includes a flat strip of spring steel coiled up around the winding axis 50 in the shape of an Archimedes spiral to define a plurality of coils 52. As is generally understood, an Archimedean spiral is defined as the locus of points corresponding to the locations over time of a point moving away from a fixed point (or axis) with a constant speed along a line which rotates with constant angular velocity about the fixed point.

The spiral spring 36 includes an inner spring end 54 and an outer spring end 56. The inner spring end 54 is attached to the second end 40 of the intermediate link 32, at the winding axis 50. The inner spring end 54 may be attached to the second end 40 of the intermediate link 32 in any suitable manner. For example, the second end 40 of the intermediate link 32 may define a slot 58, and the inner spring end 54 of the spiral spring 36 may define an inner hook 60. The inner hook 60 extends through the slot 58 and engages the second end 40 of the intermediate link 32 to secure the inner spring end 54 of the spiral spring 36 to the intermediate link 32. The outer spring end 56 is attached to the first attachment strap 30. The outer spring end 56 may be attached to the first attachment strap 30 in any suitable manner. For example, the first attachment strap 30 may include a ledge 62 or post, and the outer spring end 56 of the spiral spring 36 may define an outer hook 64. The outer hook 64 may engage or catch the ledge 62 to secure the outer spring end 56 of the spiral spring 36 to the first attachment strap 30.

Figure 3:
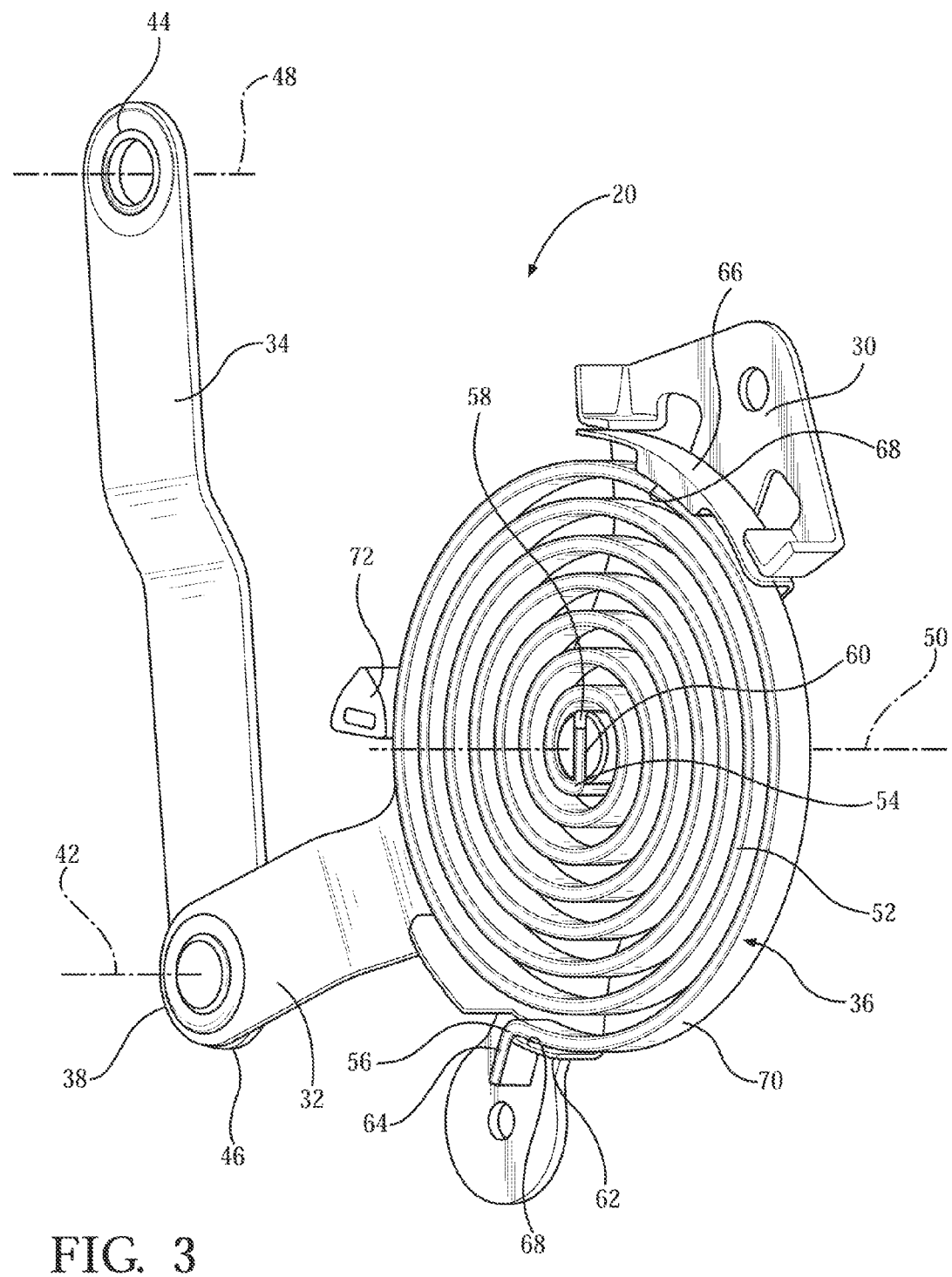
FIG. 3 is a schematic perspective view of the counterbalance mechanism.

As noted above, the spiral spring 36 includes a plurality of coils 52 wound about the winding axis 50. As best shown in FIG. 3, the first attachment strap 30 may include a spring support 66. The spring support 66 includes at least on support surface 68 that is radially positioned relative to the winding axis 50 to contact an outermost coil 70 of the spiral spring 36. Preferably, the spring support 66 includes a plurality of support surfaces 68 radially spaced about the winding axis 50. The support surfaces 68 contact the outermost coil 70 of the spiral spring 36 to position the spiral spring 36 in a spiral orientation about the winding axis 50, such that each coil of the spiral spring 36 moves away from the winding axis 50 with a substantially constant angular velocity to provide a substantially equal radial spacing between adjacent coils 52 of the spiral spring 36. The spiral orientation may alternatively be described as a substantially concentric orientation about the winding axis 50. When positioned in the spiral orientation (concentric orientation), each coil of the spiral spring 36 is substantially concentric or symmetric with respect to the other coils 52 of the spiral spring 36 and the winding axis 50, to provide a substantially equal radial spacing between adjacent coils 52 of the spiral spring 36, thereby ensuring that adjacent coils 52 do not contact each other.

The intermediate link 32 may further include a stop 72. The stop 72 is operable to engage the second attachment strap 34 and prevent relative rotation, between the second attachment strap 34 and the intermediate link 32, beyond a pre-determined angular position. The stop 72 may include, for example, a projection that engages the second attachment strap 34 when the second attachment strap 34 and the intermediate link 32 are disposed at a pre-defined angular position, thereby preventing the second attachment strap 34 and the intermediate link 32 from rotating past the pre-determined angular position. In so doing, the stop 72 may be used to prevent complete un-winding of the spiral spring 36.

In use, the spiral spring 36 is pre-loaded or wound to provide a torque. The torque from the spiral spring 36 operates to bias the panel 24 from the closed position, such as shown in FIG. 1, into the open position, such as shown in FIG. 2. It should be appreciated that the torque from the spiral spring 36 is preferably not sufficient to move the panel 24 from the closed position into the open position, but rather provides an assist force to reduce the amount of force a user must apply to move the panel 24 from the closed position into the open position. Referring to FIG. 1, the torque from the spiral spring 36 biases against the intermediate link 32, and urges the intermediate link 32 into clockwise rotation about the winding axis 50. As the intermediate link 32 rotates in a counterclockwise direction about the winding axis 50, as viewed on the page of FIG. 1, the first end 38 of the intermediate link 32 lifts the second attachment strap 34 and the panel 24 upward, toward the open position shown in FIG. 2. As the first end 38 of the intermediate link 32 lifts the second end 46 of the second attachment strap 34 upward, the second end 46 of the second attachment strap 34 rotates relative to the first end 38 of the intermediate link 32 to open or increase the angle therebetween. Accordingly, as the intermediate link 32 rotates clockwise about the winding axis 50, the distance between the panel support axis 48 and the winding axis 50 increases, thereby causing the panel 24 to lift and rotate about the panel rotation axis 28.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

The invention claimed is:

1. A counterbalance mechanism comprising:
   a first attachment strap;
   an intermediate link rotatably attached to the first attachment strap and rotatable about a winding axis relative to the first attachment strap;
   a second attachment strap rotatably attached to the intermediate link, with the second attachment strap and the intermediate link being rotatable about a link axis relative to each other; and
   a spiral spring interconnecting the first attachment strap and the intermediate link, wherein the spiral spring biases the intermediate link about the winding axis to rotate the intermediate link and the second attachment strap relative to each other about the link axis;
   wherein the spiral spring includes an outer spring end attached to the first attachment strap, and an inner spring end attached to the intermediate link.

2. The counterbalance mechanism set forth in claim 1 wherein the intermediate link extends between a first end and a second end, wherein the first end of the intermediate link is attached to the second attachment strap at the link axis, and wherein the second end of the intermediate link is attached to the first attachment strap at the winding axis.

3. The counterbalance mechanism set forth in claim 2 wherein the inner spring end of the spiral spring is attached to the second end of the intermediate link.

4. The counterbalance mechanism set forth in claim 2 wherein the second attachment strap extends between a first end and a second end, wherein the first end of the second attachment strap is configured for attachment to a moveable panel, and wherein the second end of the second attachment strap is attached to the first end of the intermediate link at the link axis.

5. The counterbalance mechanism set forth in claim 4 wherein the first attachment strap is configured for attachment to a structure, wherein the first attachment strap is fixed in position relative to the structure, wherein the first end of the second attachment strap is rotatably attached to the panel and rotatable about a panel support axis relative to the panel, and wherein the panel is rotatably attached to the structure and rotatable about a panel rotation axis relative to the structure.

6. The counterbalance mechanism set forth in claim 1 wherein the spiral spring includes a plurality of coils wound about the winding axis.

7. The counterbalance mechanism set forth in claim 6 wherein the first attachment strap includes a spring support presenting at least one support surface contacting an outermost coil of the plurality of coils of the spiral spring to position the spiral spring in a spiral orientation about the winding axis, such that each coil of the spiral spring moves away from the winding axis with a substantially constant angular velocity to provide a substantially equal radial spacing between adjacent coils of the spiral spring.

8. The counterbalance mechanism set forth in claim 1 wherein the intermediate link includes a stop.

9. A counterbalance mechanism for rotatably biasing a first component relative to a second component, the counterbalance mechanism comprising:
   a first attachment strap configured for fixed attachment to the second component;
   an intermediate link rotatably attached to the first attachment strap and rotatable about a winding axis relative to the first attachment strap, wherein the intermediate link extends between a first end and a second end, with the second end of the intermediate link rotatably attached to the first attachment strap at the winding axis;
   a second attachment strap rotatably attached to the intermediate link, with the second attachment strap and the intermediate link rotatable about a link axis relative to each other, wherein the second attachment strap extends between a first end and a second end, with the first end of the second attachment strap configured for rotatable attachment to the first component about a panel support axis, and the second end of the second attachment strap rotatably attached to the first end of the intermediate link at the link axis; and
   a spiral spring interconnecting the first attachment strap and the intermediate link, wherein the spiral spring biases the intermediate link about the winding axis to rotate the intermediate link and the second attachment strap relative to each other about the link axis, in a scissor-like motion;
   wherein the spiral spring includes an outer spring end attached to the first attachment strap, and an inner spring end attached to the intermediate link.

10. The counterbalance mechanism set forth in claim 9 wherein the inner spring end of the spiral spring is attached to the second end of the intermediate link.

11. The counterbalance mechanism set forth in claim 9 wherein the spiral spring includes a plurality of coils wound about the winding axis.

12. The counterbalance mechanism set forth in claim 11 wherein the first attachment strap includes a spring support presenting at least one support surface contacting an outermost coil of the plurality of coils of the spiral spring to position the spiral spring in a spiral orientation about the winding axis, such that each coil of the spiral spring moves away from the winding axis with a substantially constant angular velocity to provide a substantially equal radial spacing between adjacent coils of the spiral spring.

13. The counterbalance mechanism set forth in claim 9 wherein the intermediate link includes a stop.

14. A vehicle comprising:
   a body structure;
   a hood rotatably attached to the body structure, and rotatable about a panel rotation axis relative to the body structure; and
   a counterbalance mechanism rotatably biasing the hood relative to the body structure about the panel rotation axis, the counterbalance mechanism including:
      a first attachment strap attached to the body structure, wherein the first attachment strap is stationary relative to the body structure;
      an intermediate link rotatably attached to the first attachment strap and rotatable about a winding axis relative to the first attachment strap, wherein the intermediate link extends between a first end and a second end, with the second end of the intermediate link rotatably attached to the first attachment strap at the winding axis;
      a second attachment strap rotatably attached to the intermediate link, with the second attachment strap and the intermediate link rotatable about a link axis relative to each other, wherein the second attachment strap extends between a first end and a second end, with the first end of the second attachment strap rotatably attached to the hood for rotation about a panel support axis, and the second end of the second attachment strap rotatably attached to the first end of the intermediate link at the link axis; and a spiral spring interconnecting the first attachment strap and the intermediate link, wherein the spiral spring biases the intermediate link about the winding axis to rotate the intermediate link and the second attachment strap relative to each other about the link axis, in a scissor-like motion, which rotates the hood relative to the body structure about the panel rotation axis;

wherein the spiral spring includes an outer spring end attached to the first attachment strap, and an inner spring end attached to the second end of the intermediate link.

15. The vehicle set forth in claim 14 wherein the spiral spring includes a plurality of coils wound about the winding axis.

16. The vehicle set forth in claim 15 wherein the first attachment strap includes a spring support presenting at least one support surface contacting an outermost coil of the plurality of coils of the spiral spring to position the spiral spring in a spiral orientation about the winding axis, such that each coil of the spiral spring moves away from the winding axis with a substantially constant angular velocity to provide a substantially equal radial spacing between adjacent coils of the spiral spring.

17. The vehicle set forth in claim 16 wherein the intermediate link includes a stop.

* * * * *